United States Patent
Giffels et al.

(10) Patent No.: US 9,286,153 B2
(45) Date of Patent: Mar. 15, 2016

(54) MONITORING THE HEALTH OF A QUESTION/ANSWER COMPUTING SYSTEM

(71) Applicant: International Business Machines Corporation, Armonk, NY (US)

(72) Inventors: Kenneth M. Giffels, Mansfield, MA (US); Christopher J. Karle, Wayland, MA (US); William G. O'Keeffe, Tewksbury, MA (US); Ketan T. Patel, Lowell, MA (US); David D. Taieb, Charlestown, MA (US); Sabrina Yee, Norfolk, MA (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 14/104,641

(22) Filed: Dec. 12, 2013

(65) Prior Publication Data

US 2015/0169395 A1 Jun. 18, 2015

(51) Int. Cl.
*G06F 11/00* (2006.01)
*G06F 11/07* (2006.01)
*G06F 11/34* (2006.01)

(52) U.S. Cl.
CPC ............ *G06F 11/0769* (2013.01); *G06F 11/34* (2013.01); *G06F 11/3409* (2013.01)

(58) Field of Classification Search
CPC . G06F 11/30; G06F 11/3003; G06F 11/3409; G06F 11/3419
See application file for complete search history.

(56) References Cited

U.S. PATENT DOCUMENTS

| 7,152,185 | B2* | 12/2006 | Srivastava et al. ............... 714/24 |
| 2005/0033558 | A1 | 2/2005 | Schwertfuehrer |
| 2007/0196804 | A1* | 8/2007 | Yoshimura et al. ........... 434/323 |
| 2007/0265999 | A1* | 11/2007 | Amitay et al. .................... 707/2 |
| 2012/0331391 | A1* | 12/2012 | Kanjirathinkal et al. ...... 715/738 |

FOREIGN PATENT DOCUMENTS

WO 2012122198 A1 9/2012

OTHER PUBLICATIONS

SPI DST et al., "On the Complexity of Computing Probabilistic Assertions," An IP.com Prior Art Database Technical Disclosure, http://ip.com/IPCOM/000150849D, originally published Jul. 31, 1975, 24 pages.

* cited by examiner

*Primary Examiner* — Philip Guyton
(74) *Attorney, Agent, or Firm* — VanLeeuwen & VanLeeuwen; Thomas E. Tyson (57) ABSTRACT

An approach is provided for monitoring the health of a Question/Answer (QA) Computing System. In the approach, performed by an information handling system, a number of static questions are periodically submitted to the QA system, wherein each of the static questions corresponds to a previously established verified answer. Responses are received from the QA system, with the responses including answers corresponding to the submitted static questions. Monitoring the performance of the QA system based on the received responses. When the monitoring detects a problem with the QA system, a user is notified of the detected problem.

20 Claims, 8 Drawing Sheets

MONITORING THE HEALTH OF A QUESTION/ANSWER COMPUTING SYSTEM

BACKGROUND OF THE INVENTION

The User Interface for a Question Answering Computing System can produce responses to questions when entered. However, the response to the questions can take some amount of seconds if not minutes. Over time, the amount of time a question takes to answer and the accuracy of the answers can degrade. One reason for degradation could be hardware issues that adversely affect processing but are not severe enough to emerge as node failures. Another degradation mechanism could be incremental ingestion of corpus causing the machine learning state to gradually fall out of alignment, eventually requiring a machine learning retraining process.

SUMMARY

An approach is provided for monitoring the health of a Question/Answer (QA) Computing System. In the approach, performed by an information handling system, a number of static questions are periodically submitted to the QA system, wherein each of the static questions corresponds to a previously established verified answer. Responses are received from the QA system, with the responses including answers corresponding to the submitted static questions. Monitoring the performance of the QA system based on the received responses. When the monitoring detects a problem with the QA system, a user is notified of the detected problem.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
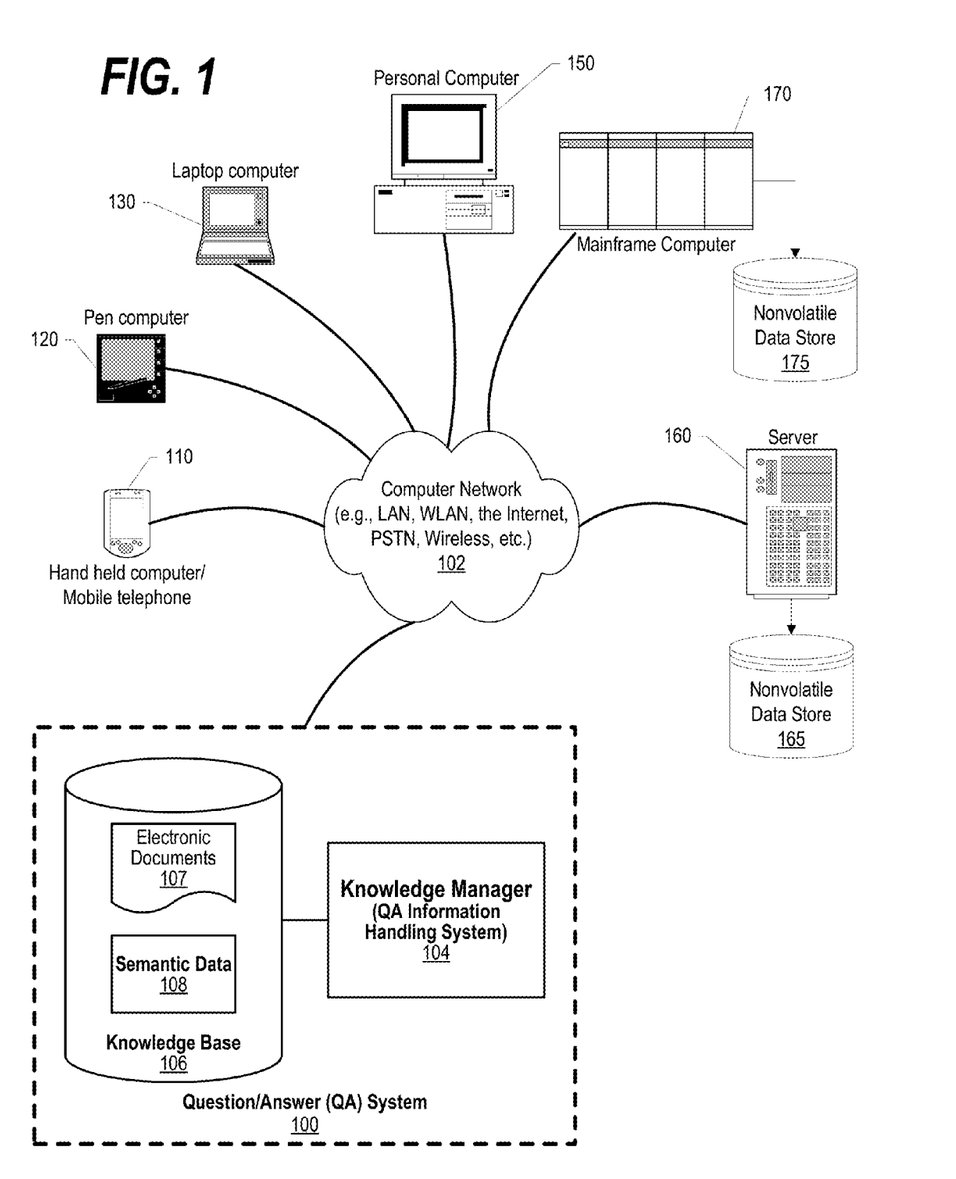
FIG. 1 depicts a network environment that includes a knowledge manager that utilizes a knowledge base.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
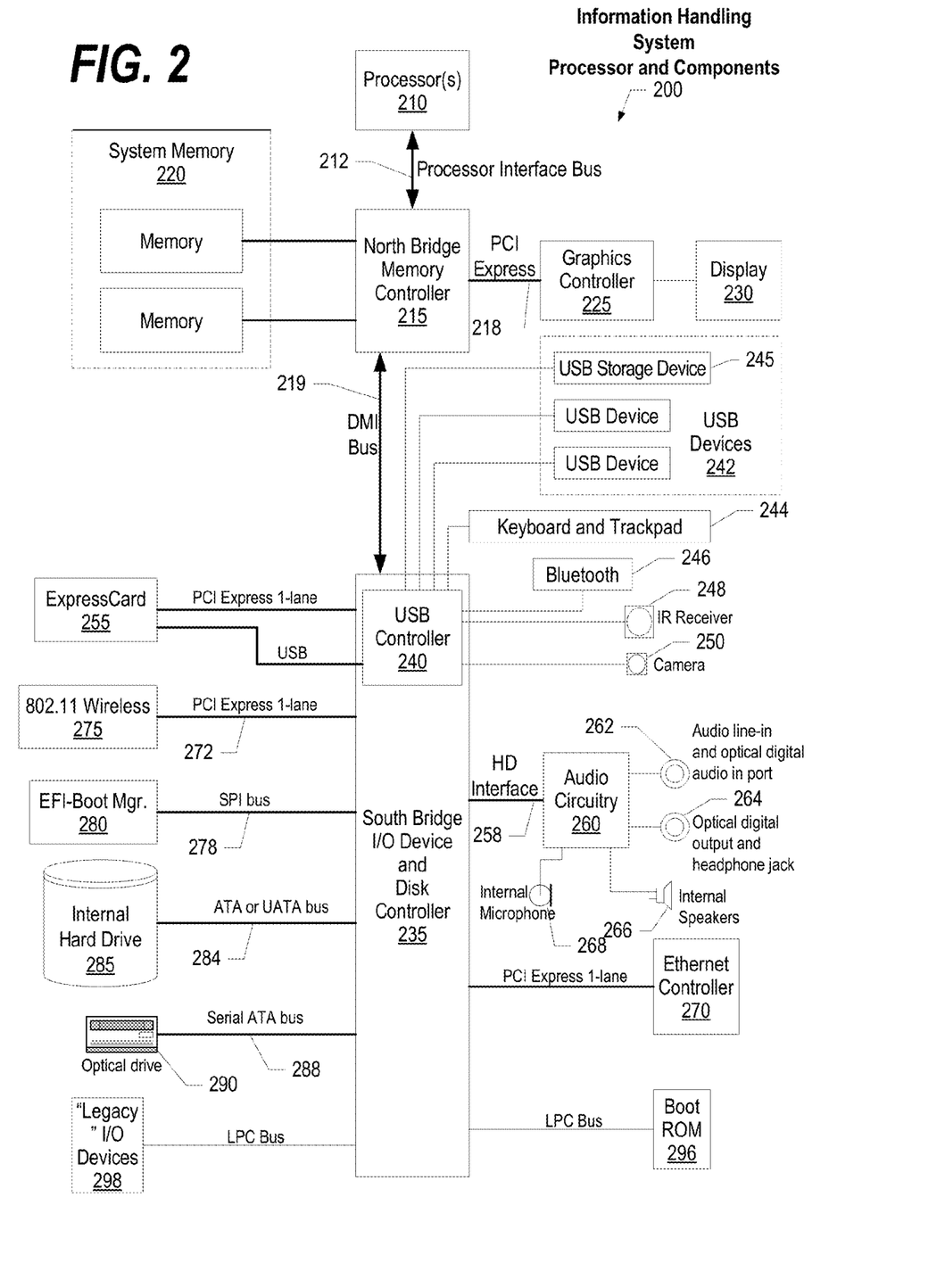
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system, to monitor the health of a Question/Answer (QA) Computing System, such as QA system 100 shown in FIG. 1. In the approach, performed by an information handling system, a number of static questions are periodically submitted to the QA system, wherein each of the static questions corresponds to a previously established verified answer. Responses are received from the QA system, with the responses including answers corresponding to the submitted static questions. Monitoring the performance of the QA system based on the received responses. When the monitoring detects a problem with the QA system, a user is notified of the detected problem. In one embodiment, the detection of a problem is provided by the system including information in a health report about the QA system that can be read by a user.

Figure 3:
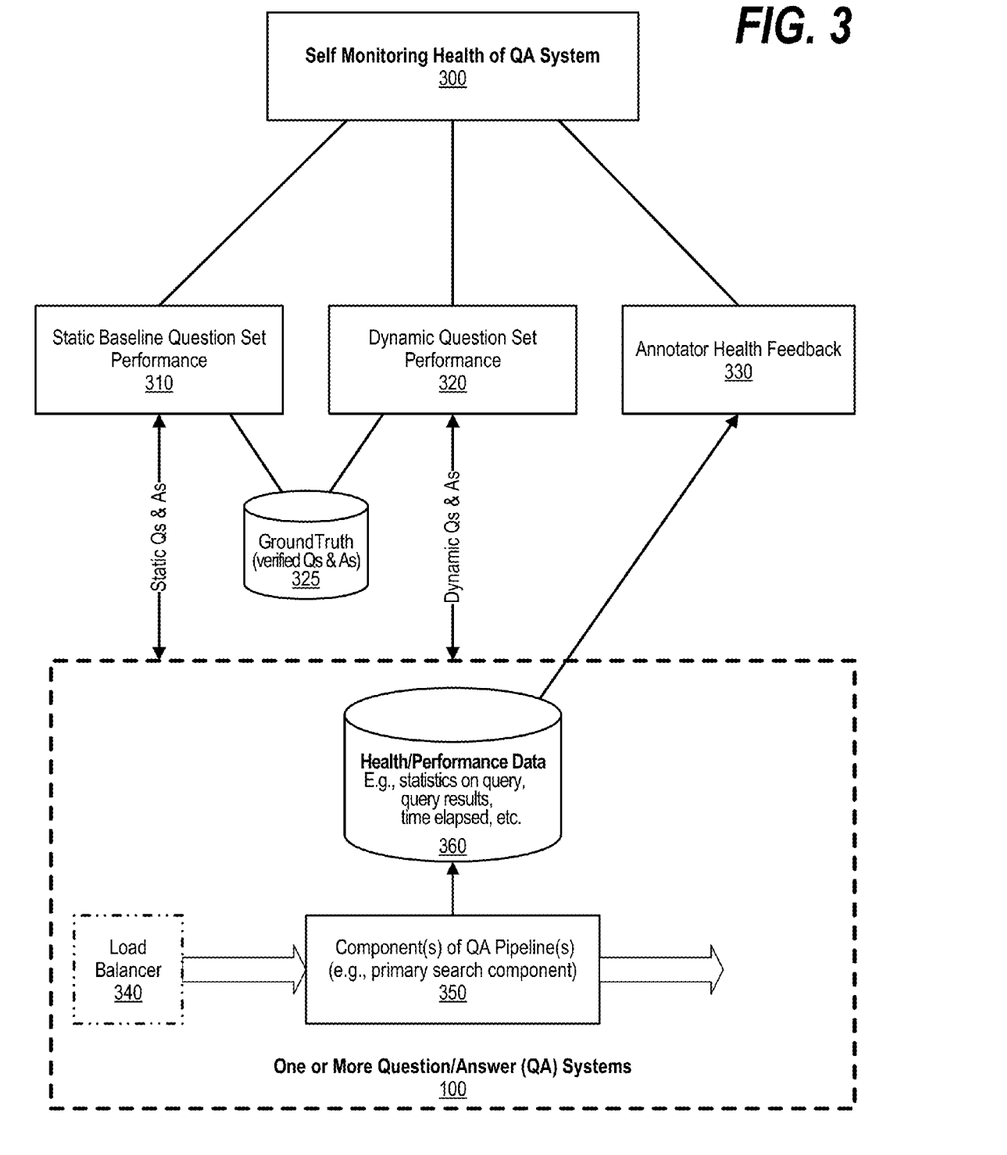
FIG. 3 is a component diagram depicting the various components in monitoring the health of a Question/Answer (QA) computing system.

FIG. 3 is a component diagram depicting the various components in monitoring the health of a Question/Answer (QA) computing system. Self monitoring the health of a QA system (300) includes several components that test different aspects of the QA system. Static baseline question set performance 310 utilizes a set of questions is selected from those that were used during the initial deployment and training of QA system 100. GroundTruth data store 325 includes the set of baseline questions used in static baseline question set performance 310 as well as verified answers that correspond to the questions.

Dynamic question set performance 320 is performed on a periodic basis, e.g. every week, when a set of questions is compiled based on the input of users in the period just ending. A human administrator curates the set of questions to assign ground truth values. The dynamic questions and their answers are also stored in GroundTruth data store 335. In addition, end user input such as answer rating feedback might also be harvested to identify candidate questions. The set of questions used in dynamic question set performance 320 changes over time from period to period. Several periods' sets can be used simultaneously, by running them through the system and recording performance and answer quality.

Annotator health feedback 330 utilizes health and performance status provided by QA system components. Some individual annotators in the pipeline will record the health and performance status of one or more components 350 included in the pipeline utilized by QA system 100 to answer questions. One such example is a primary search component that logs statistics on the query attempted, the query results, and time elapsed. The annotator might also have its own determination of operating health and can record that as well. In one embodiment, the health and performance data regarding a pipeline component are stored in data store 360 into which the annotator logs statistics such as the query attempted, the query results, the time elapsed, etc. In one embodiment annotator health feedback 330 is built around an annotator logging its health status in a data store, such as data store 360, and then that status being read later on. In another embodiment, annotator health feedback 330 might be a service (e.g., using a Representational State Transfer ("REST"), etc.) that is called by annotator health feedback when a problem is detected or using some other trigger. In this embodiment, the health monitor is notified of a problem rather than the monitor having to periodically poll the annotator to identify problems.

In an embodiment that utilizes multiple QA systems, the health of one of the QA systems could affect how questions are routed through IP splitter and load balancer 340 use to direct incoming questions to one of the QA systems. In this embodiment, load balancer 340 would stop or limit incoming questions from being routed to a QA system that is experiencing problems etc. with those problems having been detected by the components shown in FIG. 3 to self monitoring the health of the QA Systems.

Figure 4:
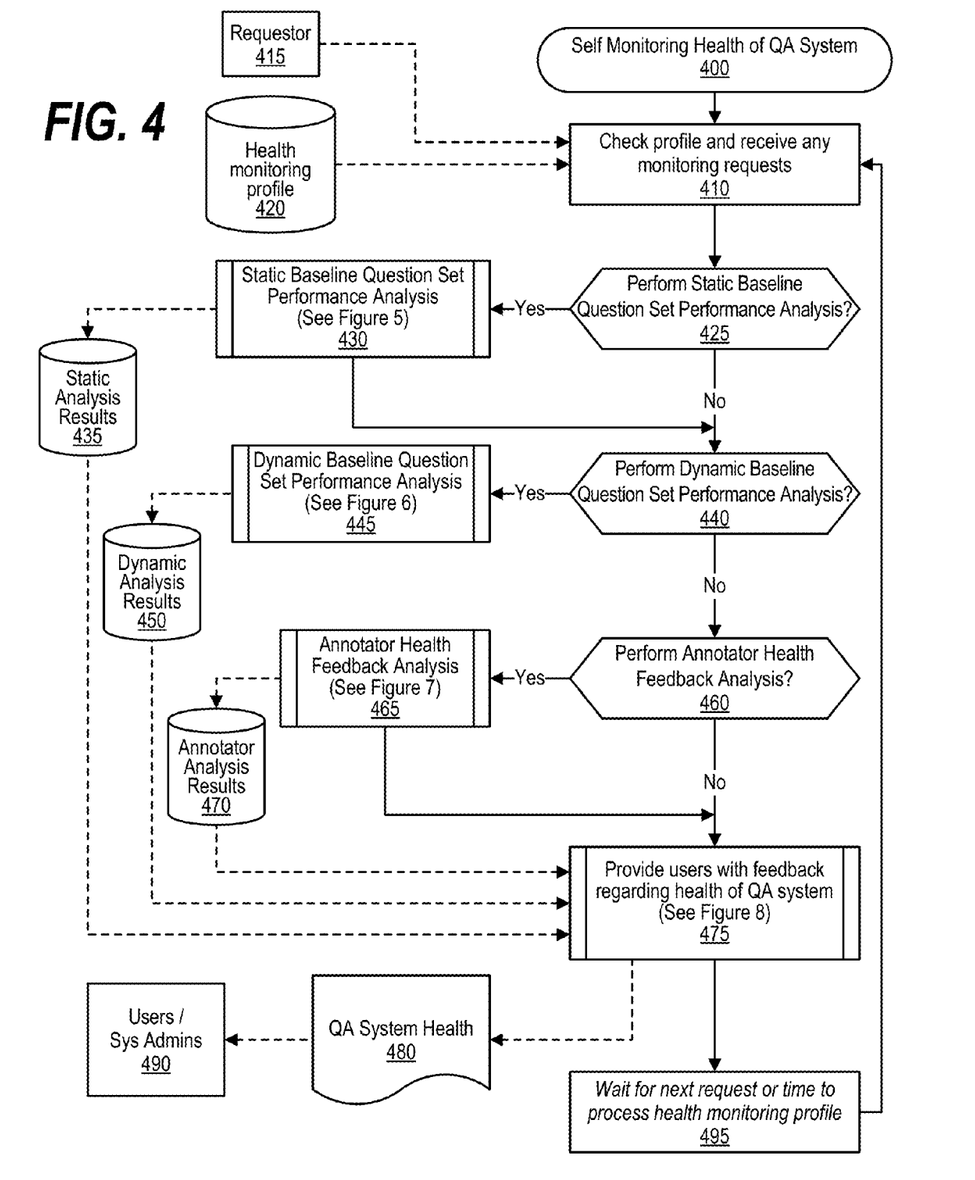
FIG. 4 is a depiction of a flowchart showing the logic used in monitoring the health of the QA computing system.

FIG. 4 is a depiction of a flowchart showing the logic used in monitoring the health of the QA computing system. Processing commences at 400 whereupon, at step 410, the process checks the health monitoring profile retrieved from data store 420 and receives any monitoring requests from requestor 415, such as a QA system administrator or other type of QA system user.

A decision is made by the process as to whether to perform the static baseline question set performance analysis on a QA system (decision 425). If the static baseline question set performance analysis is being performed, then decision 425 branches to the "yes" branch whereupon, at predefined process 430, the process performs the static baseline question set performance analysis (see FIG. 5 and corresponding text for processing details). The results from the static baseline question set performance analysis are stored in data store 435. On the other hand, if the static baseline question set performance analysis is not being performed, then decision 425 branches to the "no" branch bypassing predefined process 430.

A decision is made by the process as to whether to perform the dynamic baseline question set performance analysis on a QA system (decision 440). If the dynamic baseline question set performance analysis is being performed, then decision 440 branches to the "yes" branch whereupon, at predefined process 445, the process performs the dynamic baseline question set performance analysis (see FIG. 6 and corresponding text for processing details). The results from the dynamic baseline question set performance analysis are stored in data store 450. On the other hand, if the dynamic baseline question set performance analysis is not being performed, then decision 440 branches to the "no" branch bypassing predefined process 445.

A decision is made by the process as to whether to perform the annotator health feedback analysis on a QA system (decision 460). If the annotator health feedback analysis is being performed, then decision 460 branches to the "yes" branch whereupon, at predefined process 465, the process performs the annotator health feedback analysis (see FIG. 7 and corresponding text for processing details). The results from the annotator health feedback analysis are stored in data store 470. On the other hand, if the annotator health feedback analysis is not being performed, then decision 460 branches to the "no" branch bypassing predefined process 465.

Figure 8:
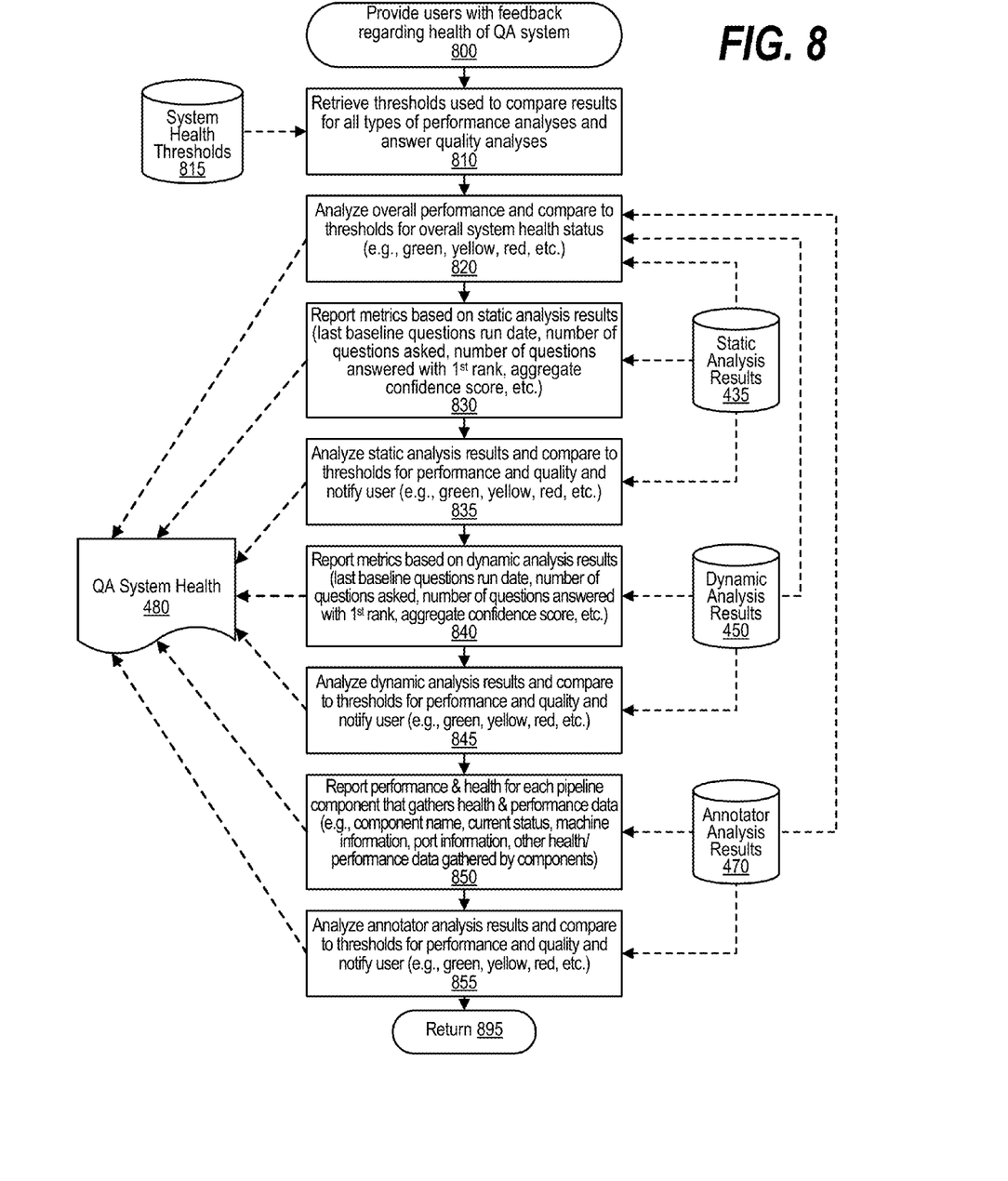
FIG. 8 is a depiction of a flowchart showing the logic used to provide users with feedback regarding the health of the QA system.

After one or more analysis routines have been performed, at predefined process 475, the process provides a user of the QA system, such as a system administrator, with health feedback regarding the QA system (see FIG. 8 and corresponding text for processing details). The output of predefined process 475 is QA system health report 480 that is used to notify one or more users 490, such as a QA system administrator, of any problems detected in the QA system. At step 495, the process waits for the next time to process the QA system health monitoring profile (e.g., weekly, etc.) or until a requestor, such as a QA system administrator, requests performance of one or more QA system health analysis routines. When the next request is received, or time to process the health monitoring profile arrives, then process will loop back to step 410 and re-perform the processes shown in FIG. 4 as described above.

Figure 5:
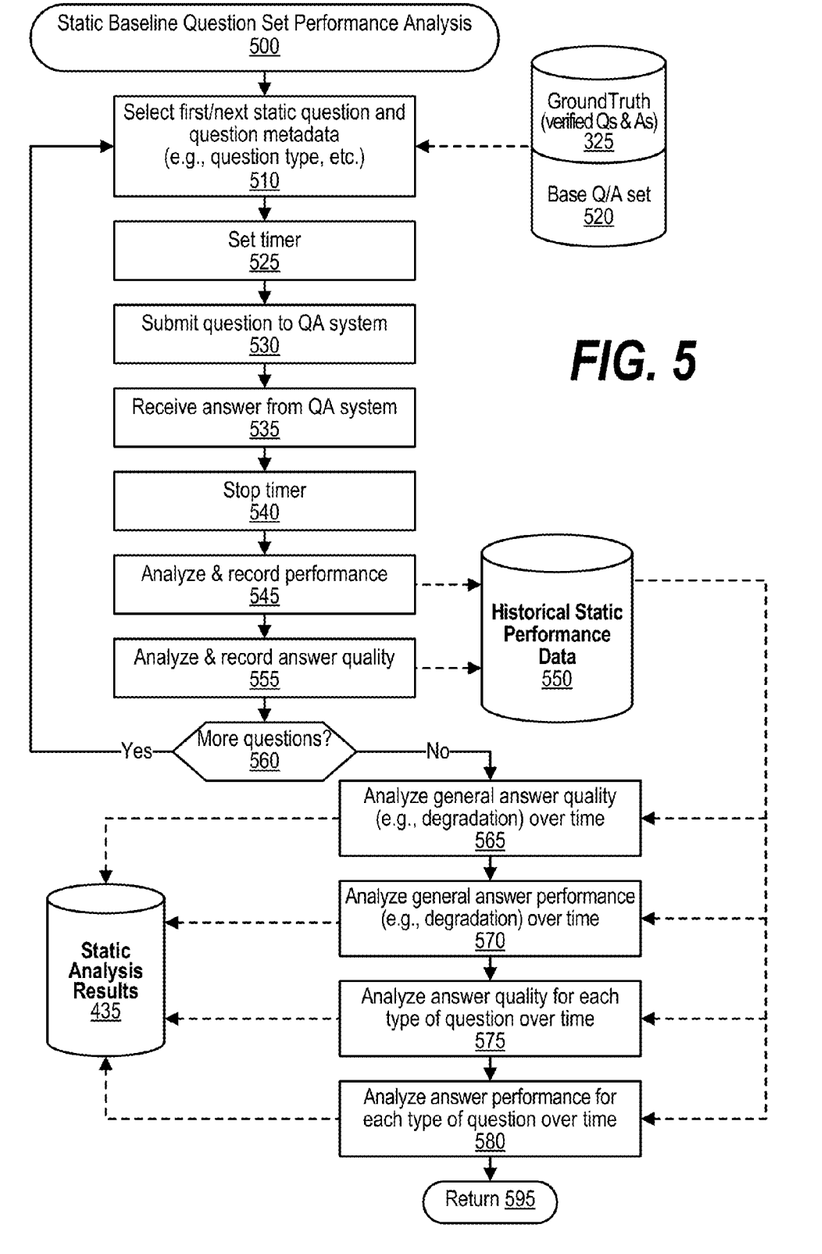
FIG. 5 is a depiction of a flowchart showing the logic used in a static baseline question set performance analysis.

FIG. 5 is a depiction of a flowchart showing the logic used in a static baseline question set performance analysis. Process commences at 500 whereupon, at step 510, the process selects the first static question and question metadata from GroundTruth data store 325. Static questions are identified as base questions 520 within GroundTruth data store 325. In one embodiment, the static questions, and their verified answers, that are included in base set 520 are the questions and answers that were used to train the QA system when it was initially deployed. In addition, metadata regarding the base questions, such as the performance metrics recorded when the base questions were initially processed by the QA system, are also included in base set 520. Metadata regarding questions also includes a question type associated with each of the questions. A question type might classify a given question as being a category relationship question, a fill-in-the-blanks question, an abbreviation question, a puzzle question, an etymology question, a verb question, a translation question, a number question, a common bond question, a definition question, a multiple-choice question, a date question, a factoid question, or some other question type.

At step 525, the process sets a timer coinciding with the submission of the selected question to the QA system at step 530. When the response is received from the QA system at step 535, the timer is stopped at step 540. At step 545, the process analyzes and records the performance of the QA system based on the received response metrics, such as the amount of time taken by the QA system to answer the question. This performance record is stored in data store 550 which is used to record the historical static performance data for the QA system that is being tested. At step 555, the process analyzes and records the answer quality of the answer received by the QA system in response to the submitted question. In one embodiment, the answer quality is based on whether the QA system responded with an answer that matches the verified answer that corresponds to the question (retrieved from data store 520). In one embodiment, the answer quality is further based on a confidence level that the QA system established for the answer that was returned at step 535.

A decision is made by the process as to whether there are more static questions to process (decision 560). If there are more static questions to process, then decision 560 branches to the "yes" branch which loops back to select and process the next static question as described above. This looping continues until all of the static questions have been processed, at which point decision 560 branches to the "no" branch for further processing.

At step 565, the process analyzes the general answer quality, using the historical answer quality data stored in data store 550, over a period of time and generates one or more general answer quality results, such the degradation of general answer quality over time. The results of the general answer quality analysis are stored in static analysis results data store 435.

At step 570, the process analyzes the general answer performance, using the historical answer quality data stored in data store 550, over the period of time and generates one or more general answer performance results, such the degradation of general answer performance over time. The results of the general answer performance analysis are stored in static analysis results data store 435.

At step 575, the process analyzes the answer quality of answers for each question type (e.g., date questions, factoid questions, etc.), using the historical answer quality data stored in data store 550, over a period of time and generates one or more answer quality results for each question type, such the degradation of answer quality pertaining to each particular question type over time. The results of the analysis of answer quality for each question type are stored in static analysis results data store 435.

At step 580, the process analyzes the answer performance of answers for each question type, using the historical answer quality data stored in data store 550, over the period of time and generates one or more answer performance results for each question type, such the degradation of answer performance pertaining to each particular question type over time. The results of the analysis of answer performance for each question type are stored in static analysis results data store 435. After the static answer analysis results have been generated and stored in data store 435, the process returns to the calling routine (see FIG. 4) at 595.

Figure 6:
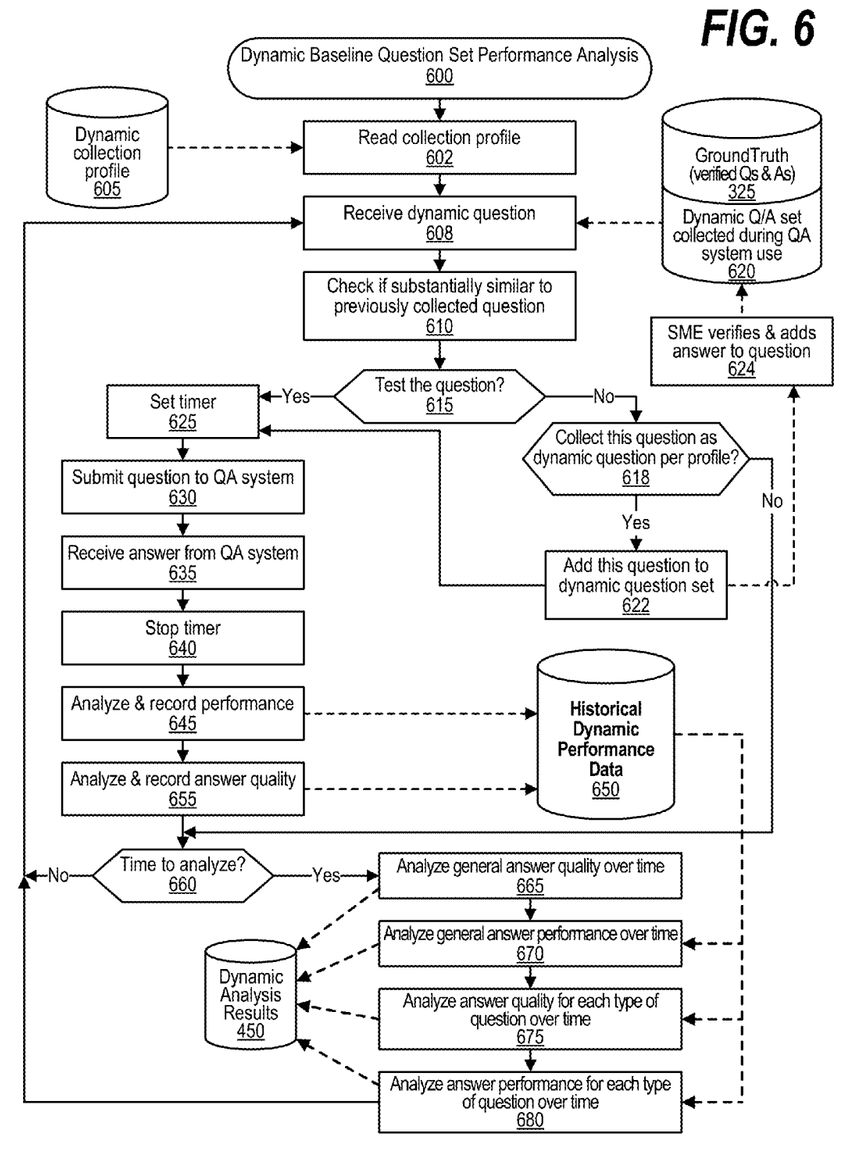
FIG. 6 is a depiction of a flowchart showing the logic used in a dynamic baseline question set performance analysis.

FIG. 6 is a depiction of a flowchart showing the logic used in a dynamic baseline question set performance analysis.

FIG. 6 is a depiction of a flowchart showing the logic used in a dynamic baseline question set performance analysis. Process commences at 600 whereupon, at step 602 the process reads the dynamic collection profile from data store 605. In one embodiment, the dynamic collection profile identifies when additional, new, dynamic questions should be collected and added to the set of dynamic questions used to monitor the health of the QA system. In one embodiment, the dynamic collection profile identifies times at which the dynamic performance analysis should be performed (e.g., weekly, etc.).

At step 608, the process receives a dynamic question from GroundTruth data store 325. Dynamic questions are identified as dynamic question set 620 within GroundTruth data store 325. In one embodiment, the dynamic questions, and their verified answers, that are included in dynamic base set 620 are questions that have been collected over time during actual usage of the QA system with answers that have been verified as correct by at least one SME (Subject Matter Expert). In addition, metadata regarding the dynamic questions, including performance metrics recorded when the questions were initially processed by the QA system, are also included in dynamic set 620. Metadata regarding questions also includes a question type associated with each of the dynamic questions. A question type might classify a given question as being a category relationship question, a fill-in-the-blanks question, an abbreviation question, a puzzle question, an etymology question, a verb question, a translation question, a number question, a common bond question, a definition question, a multiple-choice question, a date question, a factoid question, or some other question type.

At step 610, the process receives an incoming (new) question from a user of the QA system and checks to see of a substantially similar question is already in dynamic set of questions 620. A decision is made by the process as to whether to simply test the dynamic question retrieved from dynamic set of questions 620 (decision 615). If the question is not simply being tested, then decision 615 branches to the "no" branch whereupon a decision is made by the process as to whether, based on the dynamic collection profile, the system should collect the question received from a user of the QA system at step 610 (decision 618). If, based on the dynamic collection profile, the system should collect this question from the user, then decision 618 branches to the "yes" branch whereupon, at step 622 the question received from the user is added to dynamic question set 620 after having its answer verified by an SME. Processing then proceeds to step 625 to commence analyzing the initial performance of the QA system in answering the question that was just added to the dynamic question set. Returning to 615, if the process is not collecting a new question and is simply testing the question received at step 608, then decision 615 branches to the "yes" branch to perform a subsequent performance analysis on a question that was previously added to dynamic question set 620.

At step 625, the process sets a timer coinciding with the submission of the selected question to the QA system at step 630. When the response is received from the QA system at step 635, the timer is stopped at step 640. At step 645, the process analyzes and records the performance of the QA system based on the received response metrics, such as the amount of time taken by the QA system to answer the question. This performance record is stored in data store 650 which is used to record the historical dynamic performance data for the QA system that is being tested. At step 655, the process analyzes and records the answer quality of the answer received by the QA system in response to the submitted question. In the case of a new dynamic question being tested, the data added to historical data store 650 represents the initial performance metrics pertaining to the question. In one embodiment, the answer quality is based on whether the QA system responded with an answer that matches the verified answer that corresponds to the question (retrieved from data store 620). In one embodiment, the answer quality is further based on a confidence level that the QA system established for the answer that was returned at step 635.

A decision is made by the process as to whether it is time to analyze the historical dynamic performance data or if additional dynamic performance data should be collected (decision 660). If more dynamic performance data is being collected, then decision 660 branches to the "no" branch which loops back to select and process the next dynamic question as described above. This looping continues until all of the stored dynamic questions from data store 620 have been processed, at which point decision 660 branches to the "yes" branch to analyze the dynamic performance data.

At step 665, the process analyzes the general answer quality, using the historical answer quality data stored in data store 650, over a period of time and generates one or more general answer quality results, such the degradation of general answer quality over time. The results of the general answer quality analysis are stored in dynamic analysis results data store 450.

At step 670, the process analyzes the general answer performance, using the historical answer quality data stored in data store 650, over the period of time and generates one or more general answer performance results, such the degradation of general answer performance over time. The results of the general answer performance analysis are stored in dynamic analysis results data store 450.

At step 675, the process analyzes the answer quality of answers for each question type (e.g., date questions, factoid questions, etc.), using the historical answer quality data stored in data store 650, over a period of time and generates one or more answer quality results for each question type, such the degradation of answer quality pertaining to each particular question type over time. The results of the analysis of answer quality for each question type are stored in dynamic analysis results data store 450.

At step 680, the process analyzes the answer performance of answers for each question type, using the historical answer quality data stored in data store 650, over the period of time and generates one or more answer performance results for each question type, such the degradation of answer performance pertaining to each particular question type over time. The results of the analysis of answer performance for each question type are stored in dynamic analysis results data store 450. After the dynamic answer analysis results have been generated and stored in data store 450, the process returns to the calling routine (see FIG. 4) at 695.

Figure 7:
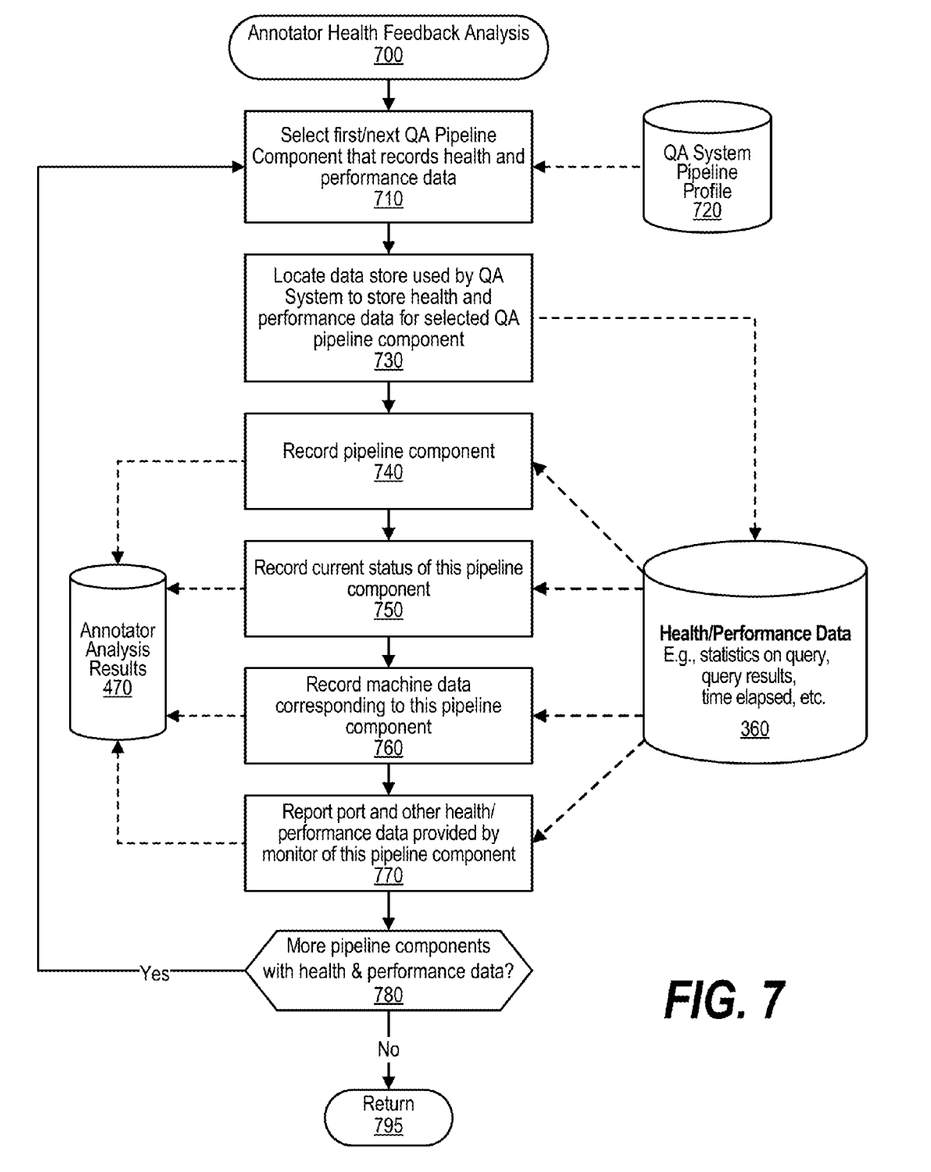
FIG. 7 is a depiction of a flowchart showing the logic used in annotator health feedback analysis.

FIG. 7 is a depiction of a flowchart showing the logic used in annotator health feedback analysis. As previously mentioned in the description of FIG. 3, the polling operations shown in FIG. 7 are but one way that annotator data can be collected and processed. For example, annotator health feedback might be performed using a service (e.g., using a Representational State Transfer ("REST"), etc.) that is called by a health feedback process, such as the process shown in FIG. 4, when a problem is detected with the QA system or by using some other trigger. In this alternative embodiment, the health monitor is notified of a problem rather than the monitor having to periodically poll the annotator to identify problems.

Returning to FIG. 7, annotator health feedback processing commences at 700 whereupon, at step 710, the process selects the first QA system pipeline component that records health and performance data of a QA system component. In one embodiment, QA system profile 720, retrieved from data store 720, is used to identify the QA system pipeline components that record health and performance data.

At step 730, the process locates the data store, such as data store 360, that is used to store the health and performance data for the selected QA system pipeline component. At step 740, the process records the QA system pipeline component in data store 470, with data store 470 being used to store annotator analysis results. The recording of the component is used to identify which component data is currently being reported. At step 750, the process retrieves the current status of the selected QA system pipeline component from data store 360 and records (stores) the current status in data store 470. At step 760, the process retrieves the machine data corresponding to the selected QA system pipeline component from data store 360 and records (stores) the machine data in data store 470. At step 770, the process retrieves the port and other health and/or performance data corresponding to the selected QA system pipeline component from data store 360 and records (stores) the port and other health and/or performance data in data store 470.

A decision is made by the process as to whether there are more QA system pipeline components that record health and performance data that need to be processed based on the QA system pipeline profile (decision 780). If there are more QA system pipeline components to process, then decision 780 branches to the "yes" branch which loops back to select and process the annotator health feedback data corresponding to the next component as described above. This looping continues until all of the QA system pipeline components that record health and performance data have been processed, at which point decision 780 branches to the "no" branch and processing returns to the calling routine (see FIG. 4) at 795.

FIG. 8 is a depiction of a flowchart showing the logic used to provide users with feedback regarding the health of the QA system. Process commences at 800 whereupon, at step 810, the process retrieves the thresholds that are used to compare the results for all types of performance analyses and for all types of answer quality analyses. The thresholds are retrieved from data store 815.

At step 820, the process analyzes the overall performance of the QA system and compares the overall performance to one or more thresholds for overall system health status. Process receives performance analysis results gathered by the static performance routine from data store 435, the dynamic performance routine from data store 450, and the annotator performance routine from data store 470. Based on a comparison of the overall performance with the appropriate thresholds, a detection of a possible overall performance problem is noted, such as by using a color coding (e.g., green, yellow, red, etc.) to notify a user of the QA system of the overall performance health of the QA system. The detection of a possible overall QA system problem and the overall QA system health analysis data is written to QA system health report 480.

At step 830, the process retrieves metrics based on static analysis results, such as the last static baseline questions run date, number of static questions asked, the number of questions answered with first rank, the aggregate confidence score, and the timing and other static performance analysis data. In addition, the static analysis results include analysis data based on each question type (e.g., factoid questions, date questions, etc.). The static performance analysis results are retrieved from data store 435. The retrieved metrics and data are written to QA system health report 480. At step 835, the process analyzes the static performance analysis results, both the answer quality results as well as the performance (e.g., timing, etc.) results and compares the results to corresponding thresholds. The static performance analysis results are retrieved from data store 435 while the thresholds were previously retrieved from data store 815. In one embodiment, the thresholds for the answer quality results and the performance results are used to indicate an alert level (e.g., green, yellow, red, etc.). In addition, thresholds are applied to each question type and the user is alerted (e.g., green, yellow, red, etc.) if a problem is detected in the QA system's processing of one or more question types. The detection of possible problems with the QA system answering static questions, including various question types, is reported to a user of the QA system by writing the detections to QA system health report 480.

At step 840, the process retrieves metrics based on dynamic analysis results, such as the last dynamic baseline questions run date, number of dynamic questions asked, the number of questions answered with first rank, the aggregate confidence score, and the timing and other dynamic performance analysis data. In addition, the dynamic analysis results include analysis data based on each question type (e.g., factoid questions, date questions, etc.). The dynamic performance analysis results are retrieved from data store 450. The retrieved metrics and data are written to QA system health report 480. At step 845, the process analyzes the dynamic performance analysis results, both the answer quality results as well as the performance (e.g., timing, etc.) results and compares the results to corresponding thresholds. The dynamic performance analysis results are retrieved from data store 450 while the thresholds were previously retrieved from data store 815. In one embodiment, the thresholds for the answer quality results and the performance results are used to indicate an alert level (e.g., green, yellow, red, etc.). In addition, thresholds are applied to each question type and the user is alerted (e.g., green, yellow, red, etc.) if a problem is detected in the QA system's processing of one or more question types. The detection of possible problems with the QA system answering dynamic questions, including various question types, is reported to a user of the QA system by writing the detections to QA system health report 480.

At step 850, the process reports data regarding performance and health for each QA system pipeline component that gathers health and performance data. In one embodiment, the reporting includes data such as the component name, the current status of the component, machine information corresponding to the component, port information of the component, and other health and/or performance data gathered by components. The QA system component performance and health data is retrieved from data store 470. At step 855, the process analyzes the annotator analysis results retrieved from data store 470 and compares the analysis results to thresholds previously retrieved from data store 815. The thresholds are used to identify any performance and/or quality problems with any of the components and notify user of such problems, such as by using the color coded alert system (e.g., green, yellow, red, etc.). The detection of possible problems with any of the QA system components is reported to a user of the QA system by writing the detections to QA system health report 480. Processing then returns to the calling routine (see FIG. 4) at 895.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, of monitoring a Question/Answer (QA) system's health, the method comprising:
periodically submitting a plurality of static questions to the QA system, wherein each of the plurality of static questions corresponds to a previously established verified answer;
receiving a plurality of responses from the QA system, wherein the plurality of responses include QA system answers corresponding to the submitted static questions;
monitoring a performance of the QA system based on the received responses; and
responsive to the monitoring detecting a problem with the QA system, notifying a user of the QA system regarding the detected problem.

2. The method of claim 1 further comprising:
determining, based on the receiving of the responses, a response time used by the QA system to answer one or more of the static questions; and comparing the response time to a previously established timing threshold, wherein the detection of the problem is the response time exceeding the previously established timing threshold.

3. The method of claim 1 further comprising:
comparing one or more of the responsive QA system answers that correspond to one or more of the plurality of static questions with the one or more previously established verified answers that also correspond to the one or more static questions; and
determining an answer quality based on the comparisons, wherein the detection of the problem is the answer quality failing to meet a previously established quality threshold.

4. The method of claim 3 further comprising:
determining, based on the receiving of the responses, a response time used by the QA system to answer one or more of the static questions;
comparing the response time to a previously established timing threshold, wherein the detection of the problem also includes the response time exceeding the previously established timing threshold;
identifying a question type associated with each of the submitted static questions, wherein at least one of the question types is selected from a group consisting of a category relationship question, a fill-in-the-blanks question, an abbreviation question, a puzzle question, an etymology question, a verb question, a translation question, a number question, a common bond question, a definition question, a multiple-choice question, a date question, and a factoid question; and
wherein the notifying informs the user of the response time associated with each of the question types and further informs the user of the answer quality associated with each of the question types.

5. The method of claim 1 further comprising:
retrieving one or more performance data metrics collected by one or more annotators included in the QA system, wherein each of the annotators corresponds to one or more components included in a pipeline of components included in the QA system; and
comparing the retrieved performance metrics to one or more previously established pipeline component thresholds, wherein the detection of the problem is in response to a selected one of the performance data metrics exceeding the previously established pipeline component threshold that corresponds to the selected performance data metrics.

6. The method of claim 1 wherein the plurality of static questions are questions initially used to train the QA system, and wherein the method further comprises:
periodically selecting a question submitted by an end user after the training of the QA system;
gathering a first set of performance metrics of the QA system based on a first QA system processing of the end user question, wherein the first set of performance metrics include an initial processing time and an initial answer quality;
resubmitting the end user question to the QA system after a period of time;
gathering a second set of performance metrics of the QA system based on a second QA system processing of the resubmitted end user question, wherein the second set of performance metrics include a subsequent processing time and a subsequent answer quality; and
comparing the first and second set of performance metrics, wherein the detection of the problem is in response to the comparison.

7. The method of claim 6 wherein the comparing further comprising:
verifying a first answer received from the QA system based on the first QA system processing of the end user question;
storing the verified answer in a data store; and
comparing a second answer received from the QA system based on the second QA system processing of the resubmitted end user question with the verified answer retrieved from the data store.

8. An information handling system comprising:
one or more processors;
a memory coupled to at least one of the processors; and
a set of instructions stored in the memory and executed by at least one of the processors to monitor a health of a QA system, wherein the set of instructions perform actions of:
periodically submitting a plurality of static questions to the QA system, wherein each of the plurality of static questions corresponds to a previously established verified answer;
receiving a plurality of responses from the QA system, wherein the plurality of responses include QA system answers corresponding to the submitted static questions;
monitoring a performance of the QA system based on the received responses; and
responsive to the monitoring detecting a problem with the QA system, notifying a user of the QA system regarding the detected problem.

9. The information handling system of claim 8 wherein the actions further comprise:
determining, based on the receiving of the responses, a response time used by the QA system to answer one or more of the static questions; and
comparing the response time to a previously established timing threshold, wherein the detection of the problem is the response time exceeding the previously established timing threshold.

10. The information handling system of claim 8 wherein the actions further comprise:
comparing one or more of the responsive QA system answers that correspond to one or more of the plurality of static questions with the one or more previously established verified answers that also correspond to the one or more static questions; and
determining an answer quality based on the comparisons, wherein the detection of the problem is the answer quality failing to meet a previously established quality threshold.

11. The information handling system of claim 10 wherein the actions further comprise:
determining, based on the receiving of the responses, a response time used by the QA system to answer one or more of the static questions;
comparing the response time to a previously established timing threshold, wherein the detection of the problem also includes the response time exceeding the previously established timing threshold;
identifying a question type associated with each of the submitted static questions, wherein at least one of the question types is selected from a group consisting of a category relationship question, a fill-in-the-blanks question, an abbreviation question, a puzzle question, an etymology question, a verb question, a translation question, a number question, a common bond question, a definition question, a multiple-choice question, a date question, and a factoid question; and wherein the notifying informs the user of the response time associated with each of the question types and further informs the user of the answer quality associated with each of the question types.

12. The information handling system of claim 8 wherein the actions further comprise:

retrieving one or more performance data metrics collected by one or more annotators included in the QA system, wherein each of the annotators corresponds to one or more components included in a pipeline of components included in the QA system; and comparing the retrieved performance metrics to one or more previously established pipeline component thresholds, wherein the detection of the problem is in response to a selected one of the performance data metrics exceeding the previously established pipeline component threshold that corresponds to the selected performance data metrics.

13. The information handling system of claim 8 wherein the plurality of static questions are questions initially used to train the QA system, and wherein the actions further comprise:

periodically selecting a question submitted by an end user after the training of the QA system;

gathering a first set of performance metrics of the QA system based on a first QA system processing of the end user question, wherein the first set of performance metrics include an initial processing time and an initial answer quality;

resubmitting the end user question to the QA system after a period of time;

gathering a second set of performance metrics of the QA system based on a second QA system processing of the resubmitted end user question, wherein the second set of performance metrics include a subsequent processing time and a subsequent answer quality; and comparing the first and second set of performance metrics, wherein the detection of the problem is in response to the comparison.

14. The information handling system of claim 13 wherein the comparing further comprises:

verifying a first answer received from the QA system based on the first QA system processing of the end user question;

storing the verified answer in a data store; and comparing a second answer received from the QA system based on the second QA system processing of the resubmitted end user question with the verified answer retrieved from the data store.

15. A computer program product stored in a non-transitory computer readable storage medium, comprising computer instructions that, when executed by an information handling system, causes the information handling system to monitor a health of a QA system by performing actions comprising:

periodically submitting a plurality of static questions to the QA system, wherein each of the plurality of static questions corresponds to a previously established verified answer;

receiving a plurality of responses from the QA system, wherein the plurality of responses include QA system answers corresponding to the submitted static questions;

monitoring a performance of the QA system based on the received responses; and responsive to the monitoring detecting a problem with the QA system, notifying a user of the QA system regarding the detected problem.

16. The computer program product of claim 15 wherein the actions further comprise:

determining, based on the receiving of the responses, a response time used by the QA system to answer one or more of the static questions; and comparing the response time to a previously established timing threshold, wherein the detection of the problem is the response time exceeding the previously established timing threshold.

17. The computer program product of claim 15 wherein the actions further comprise:

comparing one or more of the responsive QA system answers that correspond to one or more of the plurality of static questions with the one or more previously established verified answers that also correspond to the one or more static questions; and determining an answer quality based on the comparisons, wherein the detection of the problem is the answer quality failing to meet a previously established quality threshold.

18. The computer program product of claim 17 wherein the actions further comprise:

determining, based on the receiving of the responses, a response time used by the QA system to answer one or more of the static questions;

comparing the response time to a previously established timing threshold, wherein the detection of the problem also includes the response time exceeding the previously established timing threshold;

identifying a question type associated with each of the submitted static questions, wherein at least one of the question types is selected from a group consisting of a category relationship question, a fill-in-the-blanks question, an abbreviation question, a puzzle question, an etymology question, a verb question, a translation question, a number question, a common bond question, a definition question, a multiple-choice question, a date question, and a factoid question; and wherein the notifying informs the user of the response time associated with each of the question types and further informs the user of the answer quality associated with each of the question types.

19. The computer program product of claim 15 wherein the actions further comprise:

retrieving one or more performance data metrics collected by one or more annotators included in the QA system, wherein each of the annotators corresponds to one or more components included in a pipeline of components included in the QA system; and comparing the retrieved performance metrics to one or more previously established pipeline component thresholds, wherein the detection of the problem is in response to a selected one of the performance data metrics exceeding the previously established pipeline component threshold that corresponds to the selected performance data metrics.

20. The computer program product of claim 15 wherein the plurality of static questions are questions initially used to train the QA system, and wherein the actions further comprise:

periodically selecting a question submitted by an end user after the training of the QA system;

gathering a first set of performance metrics of the QA system based on a first QA system processing of the end user question, wherein the first set of performance metrics include an initial processing time and an initial answer quality;
resubmitting the end user question to the QA system after a period of time;
gathering a second set of performance metrics of the QA system based on a second QA system processing of the resubmitted end user question, wherein the second set of performance metrics include a subsequent processing time and a subsequent answer quality; and
comparing the first and second set of performance metrics, wherein the detection of the problem is in response to the comparison.

* * * * *